(12) United States Patent
Yue et al.

(10) Patent No.: US 10,175,531 B2
(45) Date of Patent: Jan. 8, 2019

(54) LIQUID CRYSTAL DISPLAY PANEL AND LIQUID CRYSTAL DISPLAY DEVICE FOR IMPROVING DISPLAY BRIGHTNESS UNIFORMITY

(71) Applicant: Shenzhen China Star Optoelectronics Technology Co., Ltd., Shenzhen, Guangdong (CN)

(72) Inventors: Shouzhen Yue, Guangdong (CN); Jinbo Guo, Guangdong (CN); Jinjie Wang, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 15/326,225

(22) PCT Filed: Dec. 22, 2016

(86) PCT No.: PCT/CN2016/111512
§ 371 (c)(1),
(2) Date: Jan. 13, 2017

(87) PCT Pub. No.: WO2018/040404
PCT Pub. Date: Mar. 8, 2018

(65) Prior Publication Data
US 2018/0224700 A1    Aug. 9, 2018

(30) Foreign Application Priority Data
Aug. 31, 2016 (CN) .......................... 2016 1 0794236

(51) Int. Cl.
*G02F 1/1345* (2006.01)
*G09G 3/36* (2006.01)
(Continued)

(52) U.S. Cl.
CPC ........ *G02F 1/133611* (2013.01); *G06T 5/008* (2013.01); *G09G 3/36* (2013.01);
(Continued)

(58) Field of Classification Search
CPC ........... G02F 1/133611; G02F 1/13452; G09G 3/3674; G09G 3/3685; G09G 3/3607; G09G 2320/0223; G09G 2320/0233; G06T 5/008
See application file for complete search history.

(56) References Cited

U.S. PATENT DOCUMENTS 7,973,745 B2    7/2011    Mizukoshi et al.
2005/0286004 A1*    12/2005    Lee ..................... G02F 1/1345
349/148

(Continued)

FOREIGN PATENT DOCUMENTS

| CN | 101086995 A | 12/2007 |
|----|-------------|---------|
| CN | 102682694 A | 9/2012 |

(Continued)

OTHER PUBLICATIONS

International Search Report dated Jun. 7, 2017 for International Patent Application No. PCT/CN2016/111512.

(Continued)

*Primary Examiner* — Ibrahim A Khan
(74) *Attorney, Agent, or Firm* — Andrew C. Cheng

(57) ABSTRACT

Disclosed are a liquid crystal display panel and a liquid crystal display device for improving display brightness uniformity. The liquid crystal display panel includes a display substrate, a source driving circuit and a plurality groups of gate driving circuits. Each gate driving circuit includes a gate driving chip and a group of fan-out circuits, and resistances of wirings of different groups of fan-out circuits gradually increase along a direction away from the (Continued)

source driving circuit. The liquid crystal panel can improve brightness uniformity in different positions while displaying.

6 Claims, 3 Drawing Sheets

(51) Int. Cl.
   *G02F 1/1335* (2006.01)
   *G06T 5/00* (2006.01)
(52) U.S. Cl.
   CPC ......... *G09G 3/3607* (2013.01); *G09G 3/3674* (2013.01); *G09G 3/3685* (2013.01)

(56) References Cited

U.S. PATENT DOCUMENTS

| | | | | |
|---|---|---|---|---|
| 2006/0114209 | A1* | 6/2006 | Kim | G09G 3/3611 345/94 |
| 2007/0296659 | A1* | 12/2007 | Kwak | G02F 1/13452 345/87 |
| 2012/0319623 | A1* | 12/2012 | Cheng | G02F 1/13452 315/312 |
| 2013/0050157 | A1* | 2/2013 | Baek | G09G 3/2022 345/204 |
| 2014/0118321 | A1* | 5/2014 | Kim | G09G 3/22 345/212 |
| 2015/0015553 | A1* | 1/2015 | Cho | G09G 3/3611 345/208 |
| 2015/0294988 | A1* | 10/2015 | Hsieh | H01L 27/124 257/72 |
| 2016/0238868 | A1* | 8/2016 | Wang | G02F 1/345 |
| 2016/0377904 | A1* | 12/2016 | Shin | G02F 1/13452 257/776 |

FOREIGN PATENT DOCUMENTS

| | | |
|---|---|---|
| CN | 103745694 A | 4/2014 |
| CN | 104050942 A | 9/2014 |
| CN | 104280907 A | 1/2015 |
| CN | 105427823 A | 3/2016 |
| CN | 106205540 A | 12/2016 |
| JP | 2007011368 A | 1/2007 |
| TW | 200504412 | 2/2005 |

OTHER PUBLICATIONS

Chinese Office Action dated Apr. 3, 2018 for Chinese Patent Application No. 201610794236.6.

* cited by examiner

Charging compensation time

LIQUID CRYSTAL DISPLAY PANEL AND LIQUID CRYSTAL DISPLAY DEVICE FOR IMPROVING DISPLAY BRIGHTNESS UNIFORMITY

CROSS-REFERENCE TO RELATED APPLICATIONS

This application claims the priority of Chinese patent application CN201610794236.6, entitled "Liquid crystal display panel and liquid crystal display device for improving display brightness uniformity" and filed on Aug. 31, 2016, the entirety of which is incorporated herein by reference.

FIELD OF THE INVENTION

The present disclosure relates to the technical field of liquid crystal display device, and in particular, to a liquid crystal display panel and a liquid crystal display device for improving display brightness uniformity.

BACKGROUND OF THE INVENTION

Liquid crystal display technology has entered a stage of rapid development and the application of large sized liquid crystal display device is becoming increasingly popular. However, with increase of a size of the liquid crystal display screen, some display problems caused by the large size thereof have attracted more and more attention, and uneven display brightness distribution is one of the problems.

FIG. 1 schematically shows a structure of a display panel of a liquid crystal display device in the prior art. As shown in FIG. 1, a matrix located in a middle part is an active area composed of pixel units. A data driving circuit (Data ICs, also known as a source driving circuit) is provided above the active area and a gate driving circuit (Gate ICs) is provided on a left and/or right side of the active area, so that the pixel units can receive image data and image display can be realized. However, when the size of the liquid crystal display panel is relatively large, the problem will appear on the image displayed therein, such as an upper part is brighter while a lower part is darker. That is, the display brightness distribution of is non-uniform, as shown in FIG. 2. When the display brightness distribution is seriously non-uniform, it may cause display defects.

The present disclosure proposes a solution to the problems mentioned above, thereby improving display brightness uniformity of the liquid crystal display device.

SUMMARY OF THE INVENTION

One of the technical problems to be solved by the present disclosure is to provide a solution which can improve display brightness uniformity of a liquid crystal display device.

In order to solve the above problem, the embodiments of the present disclosure provide a liquid crystal display panel for improving display brightness uniformity. The liquid crystal display panel comprises a display substrate, which is provided with a pixel unit matrix, and scanning lines and data lines arranged to be orthogonal and corresponding to the pixel unit matrix, wherein the scanning lines and data lines drive a pixel unit according to received scan signals and data signals so as to display an image; a source driving circuit, which is located on one side of the display substrate and transmits data signals to the data lines; and a plurality of groups of gate driving circuits, which are located on one side of the display substrate perpendicular to the side where the source driving circuit is located and transmits scan signals to the scanning lines. Each group of gate driving circuits comprises a gate driving chip and a group of fan-out circuits connected to the gate driving chip, and each of the fan-out circuits is connected to a corresponding scanning line. Resistances of wirings of different groups of fan-out circuits gradually increase along a direction away from the source driving circuit.

Preferably, resistances of each wirings of each group of fan-out circuits first decrease and then increase, and the resistances of the wirings in corresponding positions of different groups of fan-out circuits gradually increase along the direction away from the source driving circuit.

Preferably, the resistances of the wirings in corresponding positions of different groups of fan-out circuits gradually increase by a preset multiple along the direction away from the source driving circuit.

Preferably, the multiple by which the resistances of the wirings in corresponding positions of different groups of fan-out circuits gradually increase is determined according to the following equation:

$$t_i = 1 + \frac{t_{max}}{m-1} * \frac{R_{gate}}{R_{fan}^{max}} * i,$$

wherein, t represents a multiple by which a resistance of a wiring of an $i^{th}$ group of fan-out circuits increases, i=1, 2, ..., m−1, m represents an amount of fan-out circuit groups, m is a natural number larger than 1, $R_{fan}^{max}$ is a maximum value of the resistance of the wiring of the fan-out circuit, $R_{gate}$ is a resistance of a gate wiring in an active area of the display panel, and $t_{max}$ is an amplification multiple of the resistance.

Preferably, $t_{max}$ is in a range from 0.01 to 0.03.

Preferably, widths of the wirings of different groups of fan-out circuits gradually decrease along the direction away from the source driving circuit.

Preferably, resistances of wirings of each group of fan-out circuits are equal to one another, and the resistances of the wirings in corresponding positions of different groups of fan-out circuits gradually increase along the direction away from the source driving circuit.

Preferably, the resistances of the wirings in corresponding positions of different groups of fan-out circuits gradually increase by a preset multiple along the direction away from the source driving circuit.

Preferably, the multiple by which the resistances of the wirings in corresponding positions of different groups of fan-out circuits gradually increase is determined according to following equation:

$$t_i = 1 + \frac{t_{max}}{m-1} * \frac{R_{gate}}{R_{fan}^{max}} * i$$

wherein, $t_i$ represents a multiple by which a resistance of a wiring of an group of fan-out circuits increases, i=1, 2, ..., m−1, m represents an amount of fan-out circuit groups, m is a natural number larger than 1. $R_{fan}^{max}$ is a maximum value of the resistance of the wiring of the fan-out circuit, $R_{gate}$ is a resistance of a gate wiring in an active area of the display panel, $t_{max}$ is an amplification multiple of the resistance, and $t_{max}$ is in a range from 0.01 to 0.03.

The embodiment of the present application further provides a liquid crystal display for improving display brightness uniformity, which comprises the aforesaid liquid crystal display panel.

Compared with the prior art, one embodiment or more embodiments of the present disclosure can have the following advantages or beneficial effects.

By adjusting a charging time of the gate driving circuit to the scanning lines, charging time of the pixel unit far from the source driving circuit is compensated, thereby improving the display brightness uniformity in different positions of the liquid crystal display panel.

Other advantages, objectives, and features of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The accompanying drawings provide further understandings of the present disclosure or the prior art, and constitute one part of the description. The drawings are used for interpreting the present disclosure together with the embodiments, not for limiting the present disclosure. In the drawings.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. As long as there is no structural conflict, all the technical features mentioned in all the embodiments may be combined together in any manner, and the technical solutions obtained in this manner all fall within the scope of the present disclosure.

Figure 1:
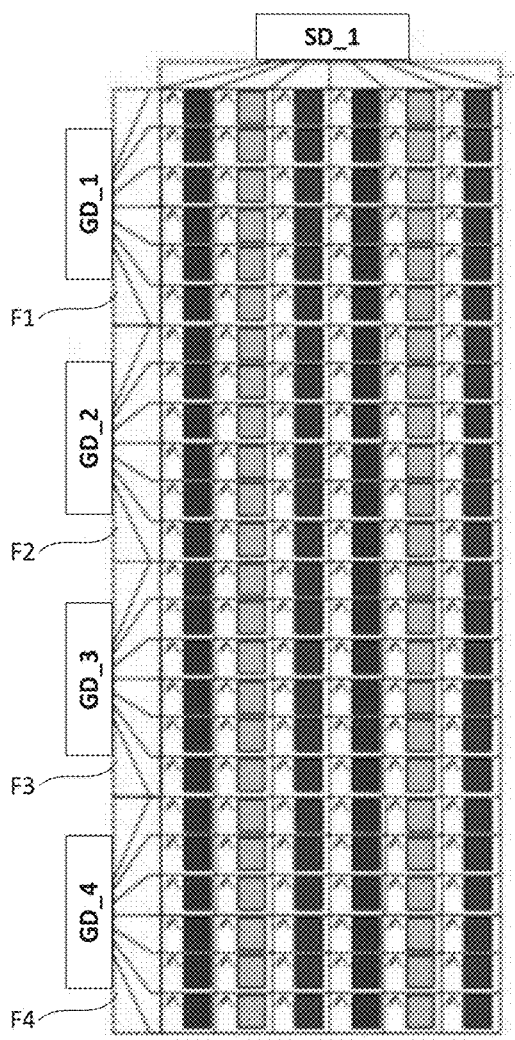
FIG. 1 schematically shows a structure of a display panel of a liquid crystal display device in the prior art.

In FIG. 1, one driving chip SD_1 is only schematically shown in a source driving circuit while four groups of gate driving circuits are shown, and each group of gate driving circuits comprises one gate driving chip and a fan-out circuit connected with the gate driving chip. As shown in FIG. 1, the gate driving chips are GD_1, GD_2, GD_3, and GD_4 respectively along a direction from SD_1 to far therefrom, and fan-out circuits corresponding to the gate driving chips are respectively F1, F2, F3, and F4.

Output signals of the source driving circuit (which outputs data signals) and the gate driving circuit (which outputs scan signals) first respectively transmit through wirings of respective fan-out circuits, and then transmit through scanning lines and data lines to a pixel unit array of a display panel. A delay exists in the scanning lines and data lines during transmission of signal data, which is mainly resulted from an RC delay of signal lines.

Figure 3:
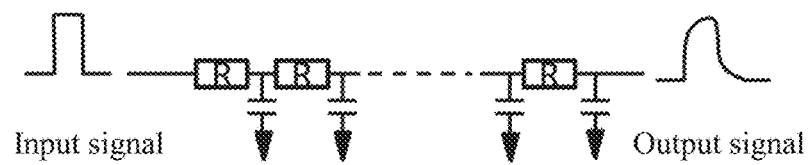
FIG. 3 schematically shows a si transmission delay on a scanning line and a data line.

As shown in FIG. 3, the scanning lines (data lines) can be equivalent to a one-stage low-pass filter comprising one resistor and one capacitor, which results in RC delay effect on signals, and thus output signals away from the scanning lines (data lines) will have a waveform distortion relative to input signals.

Display differences will be generated due to delay or distortion of signal waveforms transmitted to different positions in a pixel unit matrix. Specifically, the further the pixel unit from the driving circuit, the more serious the signal delay and/or the waveform distortion will be. Since charging of the pixel unit depends on driving signals applied by a gate and a source (a drain) of a thin film transistor (TFT), charging situations of the pixels are not identical in different positions in the pixel unit matrix on the panel, thereby resulting in display difference.

Figure 2:
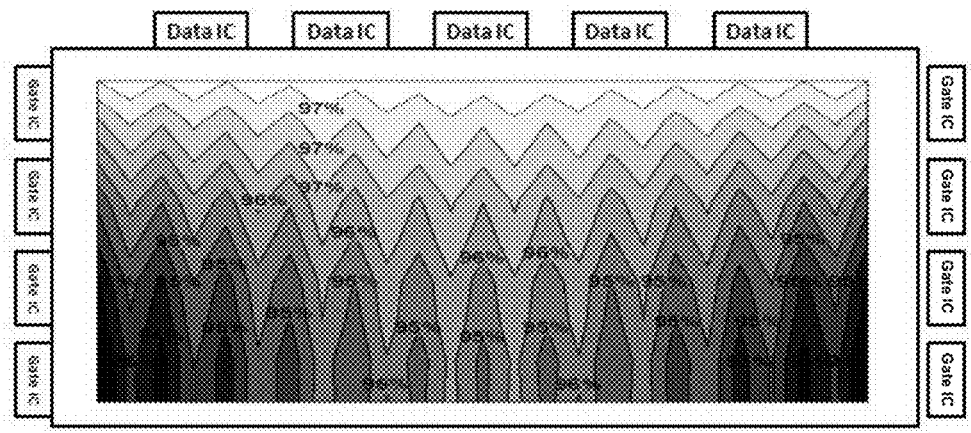
FIG. 2 schematically shows a simulation test using SPICE of the charging situation of a 55-inch ultra-high-definition display panel.

It can be easily understood that, the RC delay on the data lines is the largest on an opposite side of the source driving circuit. If a turned-on time of each row of pixel units is the same, the charging time of the pixel units at an upper edge near the source driving circuit is longer than that of the pixel units at a lower edge away from the source driving circuit. The charging time of the pixel units on the opposite side of the source driving circuit is the shortest. The panel is brighter on one side thereof adjacent to the source driving circuit, and is darker on the other side thereof away from the source driving circuit. That is, the uneven brightness as shown in FIG. 2 will be generated.

Therefore, according to one embodiment of the present disclosure, a liquid crystal display panel is provided, which compensates insufficient charging time caused by the signal transmission delay. Specifically, the charging time of each group of gate driving circuits to the pixel unit connected thereto gradually increases along a direction away from the source driving circuit.

As shown in FIG. 1, the charging time of the gate driving circuit comprising GD_1 and F1 to the pixel unit connected thereto is larger than that of the other groups of gate driving circuits (GD_2 and F2, GD_3 and F3, and GD_4 and F4). The charging time of the gate driving circuit comprising GD_2 and F2 to the pixel unit connected thereto is larger than that of the gate driving circuit comprising GD_3 and F3, and that of the gate driving circuit comprising GD_4 and F4. The charging time of the gate driving circuit comprising GD_3 and F3 to the pixel unit connected thereto is larger than that of the gate driving circuit comprising GD__4 and F4.

Figure 4:
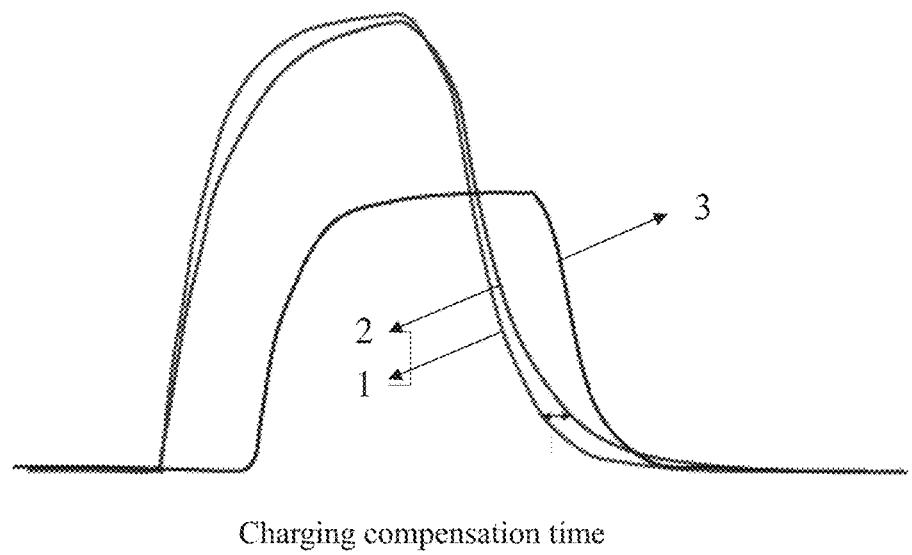
FIG. 4 schematically shows a principle of compensating the charging time according to one embodiment of the present disclosure.

When the charging time of the gate driving circuit to the pixel unit connected thereto increases along the direction away from the source driving circuit, a turned-off time of a transistor is postponed and the charging time of the transistor is increased accordingly. As shown in FIG. 4, waveform 1 shows a scanning signal when the charging time of the gate scanning lines is not compensated and waveform 2 shows a scanning signal after charging time compensation of the gate scanning lines. The comparison of the two waveforms shows a charging compensation time in FIG. 4.

The transistor remains in a turned-on state during the charging compensation time, and a data signal (waveform continues charging the pixel unit through the transistor in the turned-on state during this period. Although the data signal has a large lag due to transmission delay of the data lines, the pixel unit can be charged to a preset electric potential since the charging time of the transistor is prolonged, and the uneven brightness of the liquid crystal display panel can be alleviated.

According to one embodiment of the present disclosure, the increase of the charging time for the pixel unit can be achieved by increasing the resistance of the wiring. Specifically, with respect to the gate driving circuit as shown in FIG. 1, i.e., the circuit being formed by one gate driving chip and one group of fan-out circuits connected to the gate driving chip, by connecting the fan-out circuit to the corresponding scanning line, the resistances of the wirings of different groups of fan-out circuits are enabled to increase gradually along a direction away from the source driving circuit.

As shown in FIG. 1, when each wiring of the fan-out circuit is separately processed by a special technique, the resistances of wirings of each group of fan-out circuits first decrease and then increase. According to the embodiment of the present disclosure, the resistances of the wirings of different groups of fan-out circuits gradually increase along a direction away from the source driving circuit, i.e. the resistances of the wirings in corresponding positions of different groups of fan-out circuits gradually increase along the direction away from the source driving circuit.

Figure 5A:
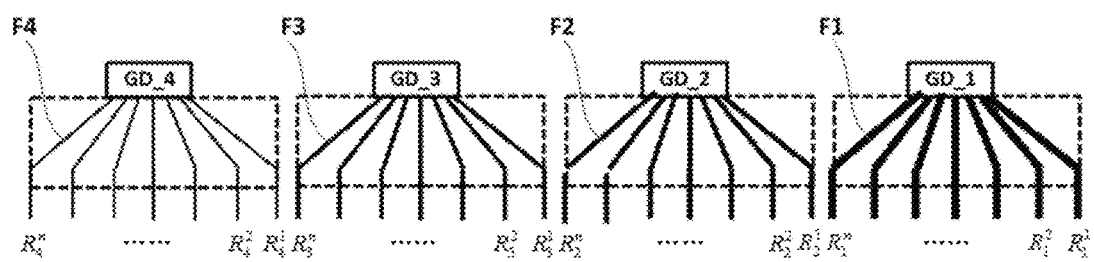
FIGS. 5a and 5b schematically show wirings of fan-out circuits according to one embodiment of the present disclosure.

As shown in FIG. 5a, the resistances of the wirings of the first group of gate driving circuits (GD_1 and F1) are referred to as $R^1_1, R^1_2, \ldots, R^n_1$ in sequence along the direction away from the source driving circuit. The resistances of the wirings of the second group of gate driving circuits ((GD_2 and F2) are referred to as $R^1_2, R^2_2, \ldots, R^n_2$ in sequence along the direction away from the source driving circuit. Therefore, $R^1_2 > R^1_1, R^2_2 > R^2_1, \ldots, R^n_2 > R^n_1$. The relationships between the resistances of the wirings in corresponding positions of the second group of gate driving circuits and the third group of gate driving circuits (GD_3 and F3), and the third group of gate driving circuits and the fourth group of gate driving circuits (GD_4 and F4) can be deduced similarly.

Since the time of the transmission circuit delay (RC delay) is determined by an RC time constant and the increase of the resistance of the wiring connecting the circuits corresponds to the increase of the value of R. Therefore, the RC time constant can be increased, thereby compensating the shortened pixel charging time due to the RC delay of the data lines.

According to another embodiment of the present disclosure, the resistances of the wirings in corresponding positions of different groups of fan-out circuits gradually increase by a preset multiple along the direction away from the source driving circuit.

Figure 5B:
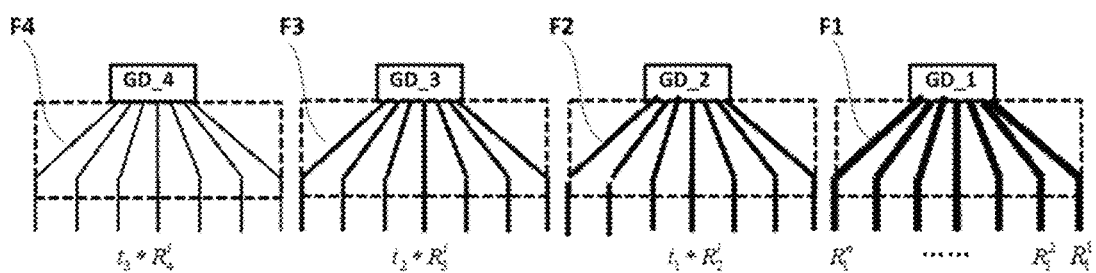

As shown in FIG. 5b, the resistance of the wiring of the first group of fan-out circuits does not change and the increased multiple thereof can be considered as 1. The increased multiple of the second group of fan-out circuits is $t_1$, i.e., the resistance of the wiring in a corresponding position of the second group of fan-out circuits is a product of $t_1$ and the resistance of the wiring in a corresponding position of the first group of fan-out circuits. The increased multiple of the third group of fan-out circuits is $t_2$, i.e., the resistance of the wiring in a corresponding position of the third group of fan-out circuits is a product of $t_2$ and the resistance of the wiring in the corresponding position of first group of fan-out circuits. The increased multiple of the fourth group of fan-out circuits is $t_3$, i.e., the resistance of the wiring in a corresponding position of the fourth group of fan-out circuits is a product of $t_3$ and the resistance of the wiring in the corresponding position of the first group of fan-out circuits.

The above mentioned $t_1$, $t_2$ and $t_3$ are determined by a following equation (1):

$$t_i = 1 + \frac{t_{max}}{m-1} * \frac{R_{gate}}{R_{fan}^{max}} * i, \qquad (1)$$

wherein, $t_i$ represents a multiple by which a resistance of a wiring of an $i^{th}$ group of fan-out circuits increases, i=1, 2, . . . , m−1, m represents an amount of fan-out circuit groups, m is a natural number larger than 1, $R_{fan}^{max}$ is a maximum value of the resistance of the wiring of the fan-out circuit, $R_{gate}$ is a resistance of a gate wiring in an active area of the display panel, $t_{max}$ is an amplification multiple of the resistance.

The amplification multiple $t_{max}$ of the resistance is in a range from 0.01 to 0.03. The larger the $t_{max}$, the more obvious effect of improving brightness uniformity of the panel, but the higher the requirements for the manufacturing procedure. The equation (1) is applicable to a product comprising a plurality of COFs.

In practice, the resistances of the wirings of the first group of fan-out circuits can be determined in accordance with prior design principles when the resistances of the wirings are designed. Then, according to the embodiment of the present disclosure, the resistances of wirings of the second group of fan-out circuits, the third group of fan-out circuits, and the fourth group of fan-out circuits away from the source driving circuit in sequence gradually increase by $t_1$, $t_2$, and $t_3$ times.

Moreover, the resistance of the wiring is related to a size of a cross section thereof. Widths of the wirings gradually decrease along the direction away from the source driving circuit, and the resistance of the wiring can be increased accordingly, thereby prolonging the charging time.

Further, according to other embodiment of the present disclosure, by designing the wirings of each group of fan-out circuits, such as increasing a length of each wiring in a middle area of each group of fan-out circuits or designing wirings on two sides thereof as double-layer wirings, the resistances of each the wirings of each group of fan-out circuits are enabled to be equal to one another, and the resistances of the wiring in corresponding positions of different groups of fan-out circuits are enabled to increase gradually along the direction away from the source driving circuit, so that the purpose of prolonging the charging time can be achieved.

Furthermore, when the resistances of the wirings of each group of fan-out circuit are equal to one another, the resistances of the wirings in corresponding positions of different groups of fan-out circuits can be configured to increase gradually by a preset multiple along the direction away from the source driving circuit, whereby the brightness uniformity of the liquid crystal display panel can be improved.

Figure 6:
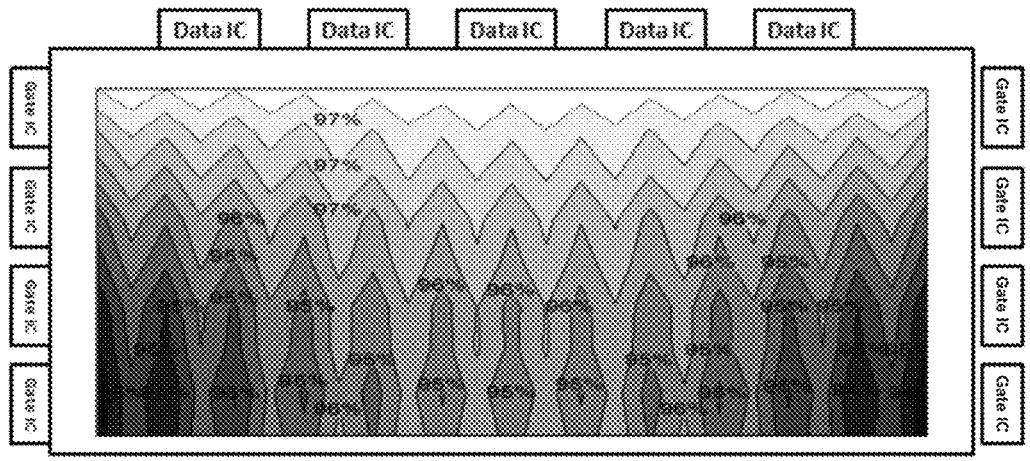
FIG. 6 schematically shows a simulation test using SPICE of the charging situation of the 55-inch ultra-high-definition display panel after compensating the charging time according to the embodiment of the present disclosure.

FIG. 6 schematically shows a simulation test using SPICE of the charging situation of the 55-inch ultra-high-definition display panel after compensating the charging time according to the above embodiment of the present disclosure. It can be seen from FIG. 6 that, the charging effect of the part of the panel away from the source driving circuit is promoted and the overall brightness uniformity of the panel is improved.

According to the embodiment of the present disclosure, the charging time of the pixel unit away from the source driving circuit can be compensated by regulating the charging time of the gate driving circuit to the scanning lines, thereby improving the brightness uniformity in different positions of the liquid crystal display panel.

The present disclosure is particularly applicable to a large size and non-GOA form liquid crystal display panel.

The above embodiments are described only for better understanding, rather than restricting, the present disclosure. Any person skilled in the art can make amendments to the implementing forms or details without departing from the spirit and scope of the present disclosure. The protection scope of the present disclosure shall be determined by the scope as defined in the claims.

The invention claimed is:

1. A liquid crystal display panel for improving display brightness uniformity, comprising:
   a display substrate, which is provided with a pixel unit matrix, and scanning lines and data lines arranged to be orthogonal and corresponding to the pixel unit matrix, wherein the scanning lines and data lines drive a pixel unit according to received scan signals and data signals so as to display an image;
   a source driving circuit, which is located on one side of the display substrate and transmits data signals to the data lines; and
   a plurality groups of gate driving circuits, which are located on one side of the display substrate perpendicular to the side where the source driving circuit is located and transmits scan signals to the scanning lines, wherein each group of gate driving circuits comprises a gate driving chip and a group of fan-out circuits connected to the gate driving chip, each of the fan-out circuits is connected to a corresponding scanning line, and resistances of wirings of different groups of fan-out circuits gradually increase along a direction away from the source driving circuit, which increase charging time of the pixel units that correspond to the wirings of different groups of fan-out circuits,
   wherein resistances of wirings of each group of fan-out circuits are equal to one another, and the resistances of the wirings in corresponding positions of different groups of fan-out circuits gradually increase along the direction away from the source driving circuit.

2. The liquid crystal display panel according to claim 1, wherein widths of the wirings of different groups of fan-out circuits gradually decrease along the direction away from the source driving circuit.

3. The liquid crystal display panel according to claim 1, wherein the resistances of the wirings in corresponding positions of different groups of fan-out circuits gradually increase by a preset multiple along the direction away from the source driving circuit.

4. The liquid crystal display panel according to claim 3, wherein the multiple by which the resistances of the wirings in corresponding positions of different groups of fan-out circuits gradually increase is determined according to the following equation:

$$t_i = 1 + \frac{t_{max}}{m-1} * \frac{R_{gate}}{R_{fan}^{max}} * i,$$

wherein, $t_i$ represents a multiple by which a resistance of a wiring of an $i^{th}$ group of fan-out circuits increases, $i=1, 2, \ldots, m-1$, m represents an amount of fan-out circuit groups, m is a natural number larger than 1, $R_{fan}^{max}$ is a maximum value of the resistance of the wiring of the fan-out circuit, $R_{gate}$ is a resistance of a gate wiring in an active area of the display panel, $t_{max}$ is an amplification multiple of the resistance, and $t_{max}$ is in a range from 0.01 to 0.03.

5. The liquid crystal display panel according to claim 1, wherein the resistances of the wirings of each group of fan-out circuits are enabled to be equal to one another through increasing a length of each wiring in a middle area of each group of fan-out circuits or designing wirings on two sides thereof as double-layer wirings.

6. A liquid crystal display device, comprising a liquid crystal display panel for improving display brightness uniformity, the liquid crystal display panel comprising:
   a display substrate, which is provided with a pixel unit matrix, and scanning lines and data lines arranged to be orthogonal and corresponding to the pixel unit matrix, wherein the scanning lines and data lines drive a pixel unit according to received scan signals and data signals so as to display an image;
   a source driving circuit, which is located on one side of the display substrate and transmits data signals to the data lines; and
   a plurality groups of gate driving circuits, which are located on one side of the display substrate perpendicular to the side where the source driving circuit is located and transmits scan signals to the scanning lines;
   wherein each group of gate driving circuits comprises a gate driving chip and a group of fan-out circuits connected to the gate driving chip, each of the fan-out circuits is connected to a corresponding scanning line, and resistances of wirings of different groups of fan-out circuits gradually increase along a direction away from the source driving circuit, which increase charging time of the pixel units that correspond to the wirings of different groups of fan-out circuits,
   wherein resistances of wirings of each group of fan-out circuits are equal to one another, and the resistances of the wirings in corresponding positions of different groups of fan-out circuits gradually increase along the direction away from the source driving circuit.

* * * * *